Figure 1:
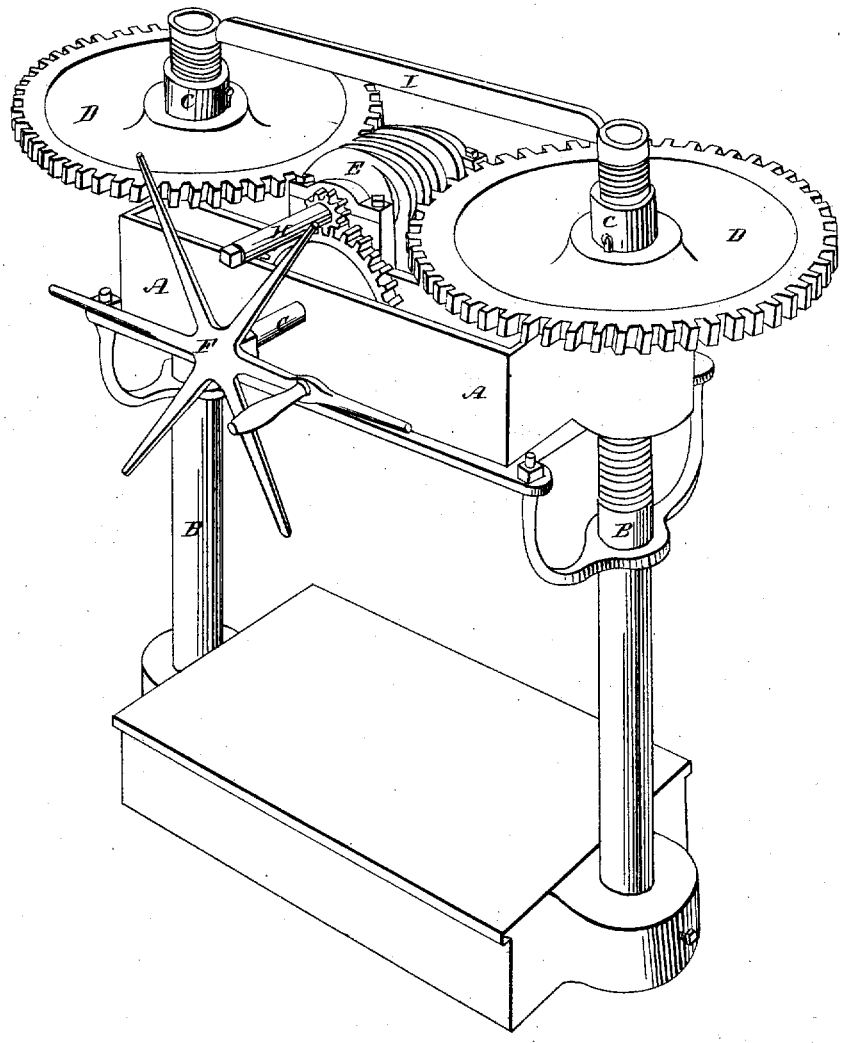
Figure 2:
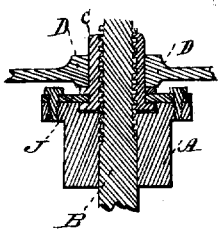

No Printed Specification Available

6572X

C. Evans,

Cotton Press.

Patented June 13, 1831.

Witnesses

R. C. Chittenden
Edward G. Wood

Inventor.

Charles Evans

AM. PHOTO-LITHO. CO. N.Y. (OSBORNE'S PROCESS)

[illegible] 6572X June. 13, 1831

[illegible]

Charles Evans, Philadelphia. Pa.
Letters Patent.
Dated June 13th 1831.

(The Schedule referred to in these Letters Patent, and making part of the same, containing a description in the words of the said Charles Evans himself, of his Improvement in the mode of constructing the Standing Press.

---

To all whom it concern be it known that I, Charles Evans of the City of Philadelphia, have invented an improved mode of constructing the Standing Press, for pressing paper, tobacco, or other articles requiring to be pressed, and that the following is a full and exact description of the same.

The bottom, or bed, and the top piece, which also answers as a platen, or follower, I usually make of cast iron, although, for certain purposes, wood, or other suitable material, may be employed. Instead of cheeks, two screws, of such length and thickness as may be required, rise vertically from the bed, one standing near each of its ends. A metal box or nut, is adapted to each of these screws, and these nuts are firmly fixed in the centre of cog-wheels. These wheels are of such diameter that when the boxes are in their place the peripheries of the wheels will approach each other within the distance necessary to allow of an endless screw to pass between them. The cogs of the wheels are cut, or made, bevelling so as to adapt them to the threads of such a screw.

The platen, or follower, is placed below the two cog-wheels, so as to raise and lower with them. The lower ends of the braces, or posts, are attached to the upper side of the follower, and are to swivel in, or on, it. Upon the upper side of the platen, an endless screw turns in collars; its threads taking into those of the cog wheels. At the outer end of its shank there is a crank, or handle, for the purpose of turning it.

The screws which occupy the place of cheeks in the ordinary press must have their threads cut in a direction contrary to each other; that is, one of them must be a right and the other a left handed screw, as the endless screw will turn the cog-wheels in opposite directions.

A Press operating in a way somewhat similar, may be made with the side screws both right or left handed, but in this case two endless screws must be cut on the same spindle, and so placed that one of the screws may act upon the periphery of one wheel, and the other on the periphery of the opposite wheel. This spindle must extend along the front, or back, of the Press.

What I claim as my invention and for which I ask a Patent, is the application of screws instead of cheeks to the sides of the standing press, so connected that the raising or lowering of the platen, or follower, may be effected by means of cog-wheels, and an endless screw, or screws, operating upon the principle herein described; with the privilege of hanging a cog-wheel on the top of platen to gear in a pinion hung on endless screw shaft to run it up.

Witnesses
Th. Christian
Wm. Stokes

Charles Evans

Exd.
496.

(Recd. & Recorded Aug. 26. 1841.)

(556 words)

Drawing